United States Patent [19]
Davies

[11] 3,789,672
[45] Feb. 5, 1974

[54] ACCELEROMETER
[75] Inventor: James W. Davies, Wayne, N.J.
[73] Assignee: Singer-General Precision, Inc., Little Falls, N.J.
[22] Filed: Nov. 12, 1970
[21] Appl. No.: 88,593

[52] U.S. Cl. ............................... 73/497, 73/516 R
[51] Int. Cl. ........................................... G01p 15/08
[58] Field of Search ............... 73/517 B, 516 R, 497

[56]   References Cited
       UNITED STATES PATENTS
3,339,419  9/1967  Wilcox ............................. 73/517 B
3,513,711  5/1970  Rogall et al. ..................... 73/517 B
3,132,521  5/1964  Krupick et al. ................... 73/517 B
3,438,266  4/1969  Carow et al. ..................... 73/516 R
3,438,265  4/1969  Davies et al. .................... 73/516 R Primary Examiner—James J. Gill
Attorney, Agent, or Firm—Thomas W. Kennedy

[57] ABSTRACT

An accelerometer wherein a proof mass is adapted for movement with respect to a coordinate axis in response to acceleration along the axis. A signal is generated in response to the movement for providing a readout proportional to acceleration, and a force is generated on said proof mass in response to the signal in a manner to realign the proof mass. The amount of force can be regulated per unit of signal, and the alignment of the movable member may be adjusted.

2 Claims, 3 Drawing Figures

Patented Feb. 5, 1974

INVENTOR
JAMES W. DAVIES

BY
Thomas W. Kennedy
ATTORNEY

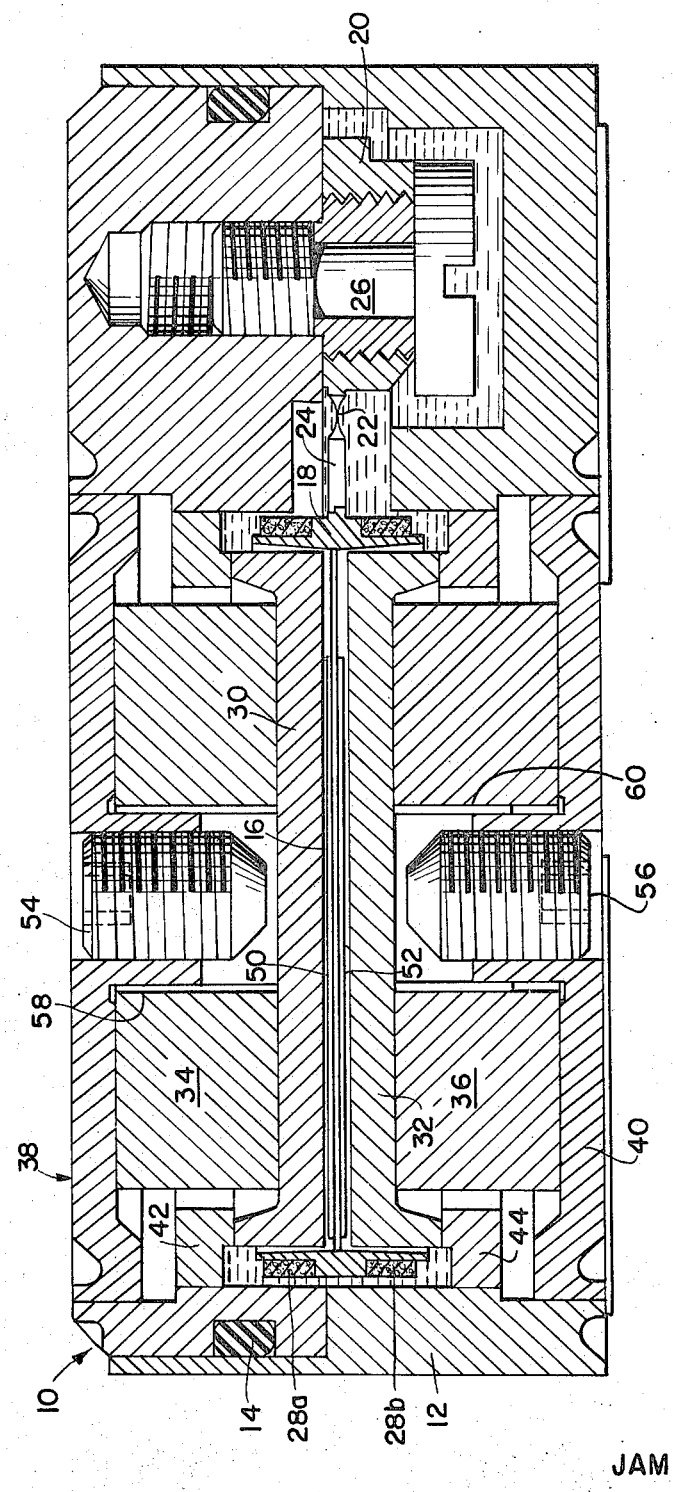

ACCELEROMETER

BACKGROUND OF THE INVENTION

This invention relates to an instrument for measuring acceleration, and more particularly to a linear axis acceleormeter for providing an electrical output signal in proportion to input acceleration.

Single axis accelerometers are well known and normally utilize a pendulous mass, or proof mass, carrying a displacement transducer and electromagnetic torquer, and adapted for pivotal movement along one axis in response to acceleration. The mass moves between a pair of spaced magnets carrying the fixed elements of the transducer and generates an output signal which activates the torquer and causes the pendulous mass to return to a null position. This signal passing through the circuit is proportional to acceleration.

However, in these arrangements the output signal is often not linear due to the varying mechanical and magnetic properties of the magnets and their associated pole pieces and coils. Also, there is no means of precisely setting or adjusting the scale factors of the accelerometers and for compensating for transient changes in scale factors due to changes in environmental conditions. Further, in these arrangements a combination of mechanical and electrical trimming is required to precisely set the restraint or bias associated with accelerometers.

SUMMARY OF THE INVENTION

It is therefore an object of the present invention to provide an accelerometer of the above type which can be adjusted so that the output signal is linearly proportioned to input accelerations.

It is a further object of the present invention to provide an accelerometer of the above type in which the scale factor of the accelerometer can be adjusted.

It is a further object of the present invention to provide an accelerometer of the above type in which the restraint on the proof mass can be adjusted mechanically to a precise degree.

Toward the fulfillment of these objects, the accelerometer of the present invention comprises a movable member mounted in said casing, reference means for establishing a reference position for said movable member with respect to a coordinate axis, said movable member being adapted to move with respect to said reference means in response to accelerations along said axis, means to generate a signal in proportion to said movement, means for establishing a force on said movable member in proportion to the magnitude of said signal in a manner to realign said movable member relative to said reference means, means to regulate the amount of force per unit of said signal, and means to adjust the alignment of said movable member relative to said reference means.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings:

FIG. 2 is a cross-sectional view taken along the line 2—2 of FIG. 2; and

DESCRIPTION OF THE PREFERRED EMBODIMENTS

Figure 1:
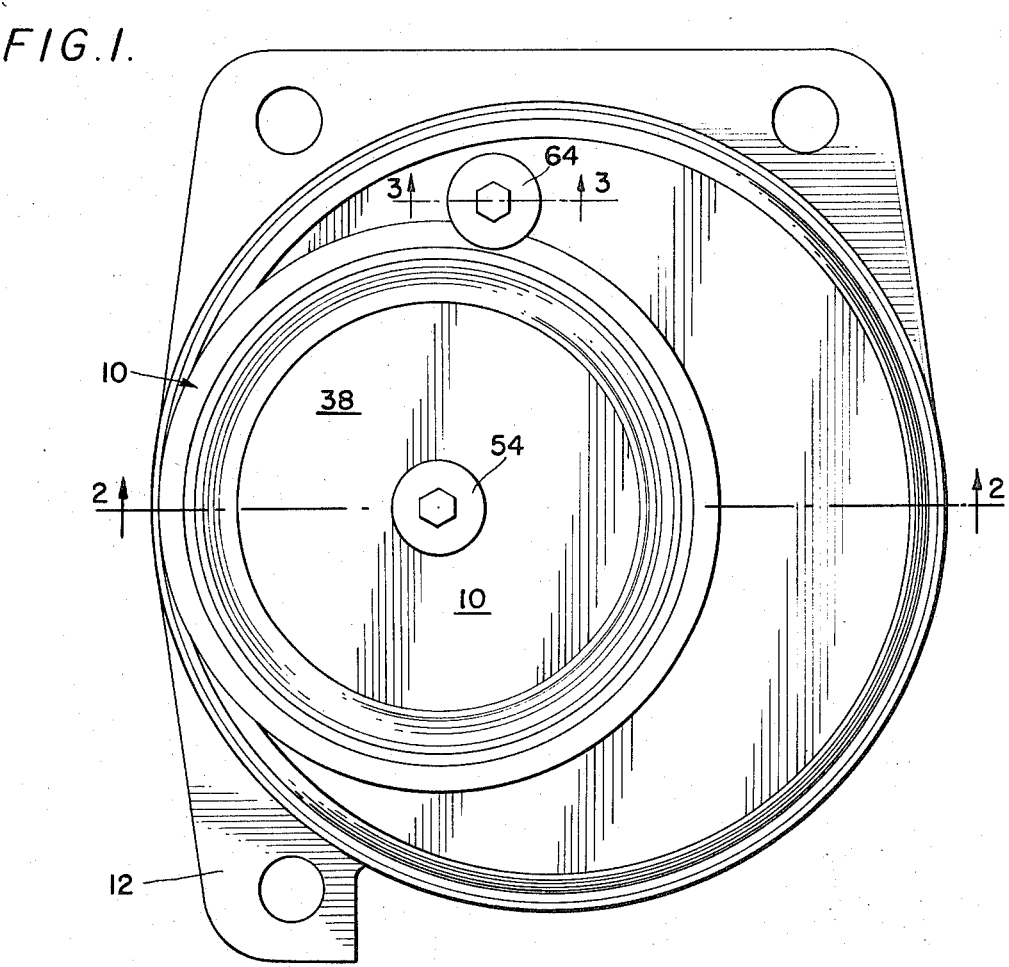
FIG. 1 is a top plan view of the accelerometer of the present invention.

Referring to FIGS. 1 and 2 of the drawings, the accelerometer of the present invention comprises an upper housing 10 and a lower housing 12 having apertured flanges for connection to a platform, a vehicle, or the like. As shown in FIG. 2, the lower housing 12 telescopes over the upper housing 10, and an O-ring seal 14 is provided therebetween.

A proof mass, in the form of a pendulum formed by a flat circular plate 16 of a relatively thin thickness having a flange 18 extending around its outer circumference, is mounted in the housing by means of a one-piece flexure hinge assembly consisting of a cylindrical portion 20 having one end abutting the bottom portion of the upper housing 10, a necked-down portion 22 integral with the cylindrical portion 20, and a connection member 24 connecting the necked-down portion 22 to the flange 18. A mounting screw 26 threadedly engages in the upper housing, with its head abutting the cylindrical portion 20 of the flexure hinge assembly in order to mount the pendulum 16 in the housing.

A pair of coiled electrical conductors 28a and 28b are wrapped around the outer circumference of the flange 18, and a pair of disk-like flanged pole pieces 30 and 32 are mounted in the housing immediately adjacent the pendulum 16. The pole pieces 30 and 32 are magnetically attracted to, and in abutment with, a pair of magnetic rings 34 and 36 extending between the pole pieces 30 and 32 and a pair of magnetic cover plates 38 and 40, respectively.

A magnetic gap is established between the flanged portions of the pole pieces 30 and 32 and the corresponding inner surfaces of the cover plates 38 and 40, with a pair of non-magnetic spacer rings 42 and 44 filling portions of the gaps.

A conductive coating is provided on both surfaces of the pendulum 16 in order to form two capacitor plates shown in general by the reference numerals 50 and 52. Each of these plates cooperates with the pole pieces 30 and 32, respectively, to form an electrical capacitor in a conventional manner.

A pair of shunt screws 54 and 56 are provided through openings formed in the cover plates 38 and 40, respectively, and are in threaded engagement therewith so that their axial position may be regulated in order to regulate the flux path established by the magnetic rings 34 and 36 via the pole pieces 30 and 32 and the cover plates 38 and 40, respectively.

A pair of temperature compensating sleeves 58 and 60 extend in the inner wall of the magnetic rings 34 and 36 for shunting a portion of the magnetic flux from the rings for reasons that will be explained in detail later.

Figure 3:
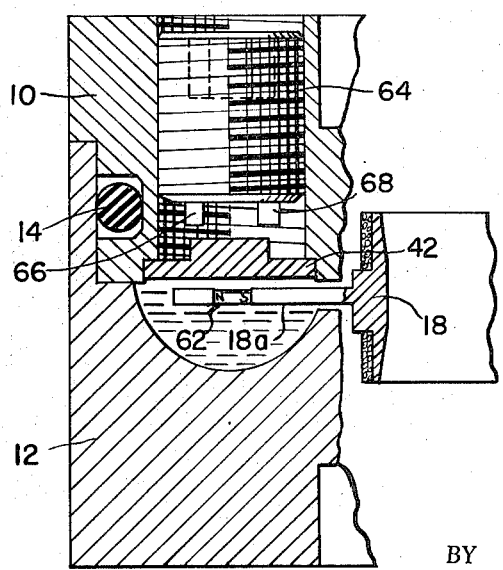
FIG. 3 is a cross-sectional view taken along the line 3—3 of FIG. 1.

With reference to FIG. 3, the flange 18 of the pendulum 16 has a finger-like extension 18a extending therefrom which carries a permanent magnet 62. A magnetic steel adjustment screw 64 is threadedly engaged in the upper housing 10 and carries a pair of permanent magnets 66 and 68, each extending perpendicular to the magnet 62. The adjustment screw 64 is rotatable with respect to the upper housing, so that different degrees of magnetic flux interaction between each of the magnets 66 and 68 and the magnet 62 can be achieved in order to control the magnetic attraction between the screw and the pendulum 16 thereby precisely compensating for the restraint on the pendulum, exclusively by mechanical means.

In operation, the pendulum 16 pivots about the necked-down portion 22 in response to accelerations in either direction along a vertical axis as viewed in FIG. 2. This movement varies the capacitance of each of the capacitors formed by the plates 50 and 52 and their corresponding pole pieces 30 and 32, respectively, which signal is directly proportional to acceleration and can be directly read out. The torquer coils 28a and 28b are also connected in a circuit with the above-mentioned capacitors, so that the above movement changes the current level in the torquer coils and therefore the interaction between the magnetic flux emitted by the latter and the magnetic rings 34 and 36 at the gap between the flanged portions of the pole pieces 30 and 32 and the corresponding portions of the cover plates 38 and 40. The design is such that the above-mentioned interaction returns the pendulum 16 to a null position or a position midway between the pole pieces 30 and 32, which interaction can be precisely controlled by means of the shunt screws 54 and 56. Also, the bias or restraint on the pendulum 16 can be precisely adjusted for calibration purposes by means of rotating the magnetic adjustment screw 64 to vary the magnetic reaction between the magnets 66 and 68 and the magnet 62.

In the event of a change in the magnetic flux of the magnetic rings 34 and 36 as a result of temperature changes, which would normally upset the calibration of the instrument, the temperature compensating sleeves 58 and 60 come into play to compensate for the flux change. As stated above, the sleeves 58 and 60 are positioned in a manner to normally shunt a portion of the magnetic flux from the magnets 34 and 36, and the material of the sleeves is selected so that the degree of shunting varies with varying temperatures to compensate for variations in the magnetic flux from the magnets as a result of temperature changes. For example, the amount of magnetic flux from the magnets 34 and 36 decreases in response to increases in temperature, while the material of the sleeves 58 and 60 can be selected so that the amount of flux shunted by the sleeves decreases in response to the increase in temperature. Therefore, the net effect is a stable flux density in the magnetic gaps between the flanged portions of the pole pieces 30 and 32 and the corresponding portions of the cover plates 38 and 40.

Of course, other variations of the specific construction and arrangement of the accelerometer disclosed above can be made by those skilled in the art without departing from the invention as defined in the appended claims.

I claim:

1. An accelerometer comprising a casing having a sensing axis, a pendulum mounted in said casing coaxially therewith, said pendulum being adapted to move with respect to said casing in response to accelerations along said axis, first and second capacitive pickoff units mounted on said pendulum coaxially therewith to generate a signal in proportion to said movement, first and second torquer units disposed adjacent said respective pickoff units coaxially therewith for establishing first and second variable forces on said pendulum, said forces varying substantially in direct proportion to the magntidue of said signal, said forces providing a net force-to-movement ratio having a selective scale factor, first and second manual torque adjusting units for adjusting said torquer scale factor before start-up, first and second automatic temperature responsive torque adjusting units for automatically adjusting said torquer scale factor after start-up, and bias means to adjust the alignment and null position of said pendulum before start-up, wherein said casing has first and second axially spaced end walls and a cylindrically shaped peripheral wall forming a cylindrically shaped sealed cavity containing a fluid and symmetrically disposed about said sensing axis, and wherein said pendulum has a flat circular web plate portion and has a cylindrically shaped outer flange ring portion symmetrically disposed about said sensing axis, wherein said first and second capacitive pickoff units respectively include first and second capacitor plates respectively mounted on axially opposite faces of said pendulum web plate portion, wherein said first and second capacitive pickoff units have means to establish an electrical circuit including said capacitor plates, wherein said end walls respectively have substantially flat axially inner faces, said flat inner wall faces being substantially parallel and being separated by a space of substantially uniform thickness, and wherein said first and second capacitor plates respectively have substantially flat axially outer faces respectively facing said flat inner wall faces, said flat outer plate faces being substantially parallel to and being separated from said flat inner wall faces respectively forming first and second gaps having selective thicknesses whereby the ratio of gap thickness to plate area is minimized.

2. The accelerometer of claim 1 wherein said first and second manual torque adjusting units respectively include first and second shunt screws respectively mounted on said first and second casing end walls and respectively disposed on axially opposite sides of said pendulum web portion coaxially therewith, and wherein said first and second automatic torque adjusting units respectively include first and second sleeve members respectively mounted on said first and second casing end walls and respectively disposed on axially opposite sides of said pendulum web portion coaxially therewith and respectively surrounding said first and second shunt screws.

* * * * *

UNITED STATES PATENT OFFICE
CERTIFICATE OF CORRECTION

Patent No. 3,789,672  Dated February 5, 1974

Inventor(s) James W. Davies

It is certified that error appears in the above-identified patent and that said Letters Patent are hereby corrected as shown below:

On the cover sheet, in the heading, item [73] should read as follows:

-- Assignee: Singer Company, Little Falls, N.J. --.

Signed and sealed this 18th day of June 1974.

(SEAL)
Attest:

EDWARD M. FLETCHER, JR.
Attesting Officer

C. MARSHALL DANN
Commissioner of Patents